United States Patent
Rajagopalan

(10) Patent No.: US 6,306,049 B1
(45) Date of Patent: Oct. 23, 2001

(54) METHOD OF IMPROVING IMPACT RESISTANCE IN GOLF BALL CORE FORMULATIONS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/259,879

(22) Filed: Mar. 1, 1999

(51) Int. Cl.$^7$ ..................................................... A63B 37/04
(52) U.S. Cl. ........................ 473/377; 473/378; 473/385; 473/374; 473/373; 525/221; 525/196; 428/421; 428/422
(58) Field of Search ..................................... 473/378, 377, 473/374, 373, 385; 273/DIG. 22; 525/196, 221, 330.2; 526/318.45; 428/421, 422

(56) References Cited

U.S. PATENT DOCUMENTS

| | | | |
|---|---|---|---|
| 4,638,034 | 1/1987 | McClain | 525/369 |
| 4,801,649 | 1/1989 | Statz | 525/183 |
| 5,218,057 | 6/1993 | Kurkov et al. | 525/369 |
| 5,543,467 | * 8/1996 | Hamada et al. | 525/207 |
| 5,779,562 | * 7/1998 | Melvin et al. | 473/373 |
| 5,824,740 | * 10/1998 | Yabuki et al. | 525/71 |
| 5,824,746 | * 10/1998 | Harris et al. | 525/196 |
| 5,833,552 | * 11/1998 | Hamada et al. | 473/359 |
| 5,919,101 | * 7/1999 | Yokota et al. | 473/374 |
| 5,932,661 | * 8/1999 | Simonutti | 525/274 |
| 5,962,140 | * 10/1999 | Rajagopalan | 428/421 |
| 5,965,669 | * 10/1999 | Cavallaro et al. | 525/221 |
| 5,971,870 | * 10/1999 | Sullivan et al. | 473/373 |
| 5,994,472 | * 11/1999 | Egashira et al. | 525/221 |
| 6,114,453 | * 9/2000 | Irii et al. | 525/221 |
| 6,130,295 | * 10/2000 | Yokota | 525/221 |

* cited by examiner

Primary Examiner—Lee Young
Assistant Examiner—Minh Trinh
(74) Attorney, Agent, or Firm—Pennie & Edmonds LLP

(57) ABSTRACT

A golf ball having a cover, a core, and, optionally, an intermediate layer between the cover and the core and a method of making such a golf ball, where at least a portion of the core is formed from a core blend of an elastomer, a metal salt acrylate or diacrylate, and at least one low modulus ionomer terpolymer or acid terpolymer. The low modulus ionomer or acid terpolymer is present in the core blend in an amount of up to about 50 pph based on the weight of the elastomer.

8 Claims, No Drawings

METHOD OF IMPROVING IMPACT RESISTANCE IN GOLF BALL CORE FORMULATIONS

FIELD OF INVENTION

The present invention is directed toward novel golf ball core compositions and golf balls comprising such compositions, and to a method for forming golf balls containing such core compositions, particularly golf balls having dual cores. Golf balls of the invention have at least one core layer comprising at least one Low Modulus Ionomer ("LMI") or corresponding acid terpolymer.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

Therefore, most amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Recently, multilayer golf balls have become available, in an effort to overcome some of the undesirable aspects of conventional two-piece balls, such as their hard feel, while maintaining the positive attributes of these balls such as their increased initial velocity and distance. Multilayer golf balls typically comprise at least one of multiple core layers, a single or multiple intermediate or mantle layer, and/or multiple cover layers. Ideally, multilayer balls have "feel" and spin characteristics approaching those of wound balls. However, the use of at least one mantle or intermediate layer or of multiple core layers has, in some cases, adversely affected the durability of the core.

A number of elastomers such as polybutadiene, natural rubber, styrene butadiene rubber, and isoprene rubber, have been used in the manufacture of golf ball cores. However, golf ball cores are now predominantly made from compositions comprising polybutadiene. In order to obtain the desired physical properties for golf balls, manufacturers have added cross-linking agents, such as metallic salts of an unsaturated carboxylic acid to the polybutadiene, typically in an amount of about 20 to 50 pph of polybutadiene. Typically, either zinc diacrylate or zinc dimethacrylate is used as the cross-linking agent, with zinc diacrylate providing a higher initial velocity than zinc dimethacrylate.

Typically, about 5 to 50 pph of zinc oxide (ZnO) is also added to the composition, as both a filler and an activation agent for the zinc diacrylate/peroxide cure system. The zinc diacrylate/peroxide cure system, which is well known in the art, cross-links the polybutadiene during the core molding process. In addition to acting as an activation agent, zinc oxide has a high specific gravity (5.6 g/cm$^3$) that allows the weight of the golf ball to be adjusted.

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approach the USGA maximum of 250 ft/s plus 2 percent test tolerance or total of 255 ft/s as closely as possible.

To meet the needs of golfers having varying levels of skill and swing speeds, golf ball manufacturers frequently vary the compression of the ball, which is a measurement of the deformation of a golf ball or core in inches under a fixed load. Often, to maximize the initial velocity of a golf ball, the hardness of the core has been increased, which increases the compression of the golf ball. However, in general, the results of durability tests show that hard cores, particularly hard outer cores in dual core golf balls, are less durable than softer cores. Attempts to improve the durability of hard cores by the addition of impact modifiers, such as copolymers of ethylene and glycidyl acrylate, to standard core compositions have resulted in golf balls having a reduced initial velocity, thereby adversely affecting the overall performance of the ball.

Therefore, a need remains for a golf ball core composition containing an impact modifier that provides a golf ball core having improved toughness and impact strength with the initial velocity of prior art golf ball cores that lack an impact modifier. The present invention provides such a core composition for golf balls.

SUMMARY OF THE INVENTION

The present invention is directed to a golf ball that comprises a cover and a core, and, optionally, at least one intermediate or mantle layer between the cover and the core, where at least a portion of the core is formed by molding a rubber or elastomer blend for a time and at a temperature sufficient to cross link the blend, the blend comprising a base rubber, which is preferably free of cross linking, a metal salt acrylate or diacrylate, an initiator, and at least one low modulus ionomer or acid terpolymer of the formula:

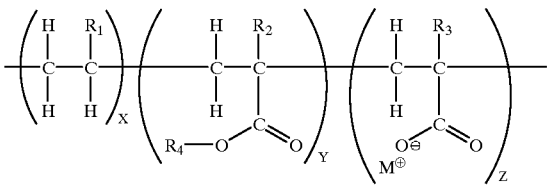

wherein $R_1$, $R_2$, and $R_3$ are hydrogen or $CH_3$;

$R_4$ is linear or branched alkyl of formula $C_nH_{2n+1}$, where n is an integer of from 1 to about 20, such as $CH_3$, $C_2H_5$, $C_3H_7$, $C_4H_9$, and $C_5H_{11}$;

$M^+$ is $H^+$, $Li^+$, $Na^+$, $Zn^{++}$, $Mg^{++}$, $Ca^{++}$, $Ti^{++}$, $Mg^{++}$, $Na^+$, $W^{+++}$, or $Zr^{++}$; and x ranges from about 20 to about 85 weight per cent of the polymer, y ranges from about 1 to about 50 weight per cent of the polymer, and z ranges from about 1 to about 30 weight per cent of the polymer. The at least one low modulus ionomer or acid terpolymer preferably has a dynamic shear storage modulus at of at least about $10^4$ dynes/cm$^2$ and a loss tangent of no more than about 1 at a frequency of about 1 Hz at 23° C. Preferably the portion of the core formed from the core composition of the invention is an outer core layer, such that the core is at least a dual core, i.e., a core comprising at least two layers. The preferred core layer typically has a hardness of at least about 15 Shore A to about 65 Shore D, a flexural modulus of at least about 500 psi, and a specific gravity of at least about 0.7. Golf balls in accordance with the invention preferably have a cover, having a thickness of from about 0.03 inch to about 0.125 inch and at least about 70 percent dimple coverage, and a core, having a diameter of from about 0.5 to about 1.6 inches and PGA compression of from about 40 to about 90. Golf balls of the invention also preferably have a PGA compression of from about 60 to about 120 and a coefficient of restitution of at least about 0.7 at an incoming velocity of 125 ft/sec, i.e., when a golf ball of the invention is propelled at a hard surface with a velocity of 125 ft/sec, it will rebound with a velocity of at least about 87.5 ft/sec. Where at least one optional mantle or intermediate layer is present, the mantle or intermediate layer typically has a thickness of at least about 0.02 inch, and the core has a diameter of less than about 1.6 inches. Any of the cover, the core, or the at least one optional mantle or intermediate layer may comprise a density adjusting filler material to increase or decrease the density. In addition, any of the cover, the core, or the at least one optional mantle or intermediate layer may have a foamed structure. The at least one optional mantle or intermediate layer may be formed from any appropriate polymeric material, or may be formed from a wound elastomeric layer.

Preferably, the low modulus ionomer or acid terpolymer has a flexural modulus of from about 500 to about 35,000 psi and a hardness of from about 40 Shore A to about 40 Shore D. Low modulus ionomers and acid terpolymers useful in the invention include, but are not limited to, terpolymers comprising monomers of an α-olefin, a softening agent, such as an acrylate class ester, such as methyl acrylate, n-butyl-acrylate, or iso-butyl-acrylate, and an α,β-unsaturated carboxylic acid, where at least a portion of the acid groups are neutralized by at least one ion in the low modulus ionomers. At least one of the low modulus ionomer and acid terpolymer is present in the core blend in an amount sufficient to improve the durability of the core, typically, up to about 50 pph based on the weight of the rubber or elastomer and, preferably, in an amount of about 5 to about 45 pph based on the weight of the of base rubber, which is preferably cis-polybutadiene, trans-polybutadiene, cis-polyisoprene, trans-polyisoprene, or a blend thereof that has most preferably not been cross linked.

The golf ball cores of the invention may be used in two-piece balls and golf balls having dual or multi-layer cores, as described above, as well as in golf balls having at least one intermediate layer or mantle layer disposed between the cover and the core, fluid filled or hollow centers, and in wound balls, which further comprises a layer of elastic thread disposed between the cover and the core. Golf balls of the invention may have covers comprising a single layer or a plurality of layers.

The present invention is also directed to a method for making a golf ball. The method of the invention comprises selecting at least one low modulus ionomer terpolymer or acid terpolymer, as described above, forming a core blend comprising the at least one low modulus ionomer or acid terpolymer, forming a rubber or elastomer blend comprising the low modulus ionomer or acid terpolymer, a base rubber, a metal salt acrylate or diacrylate, and an initiator forming at least a portion of a golf ball core from the blend, and molding a cover around the golf ball core to form a golf ball. Preferably, the core is formed by compression molding the core blend of the invention to form a core or a core layer. The method of the invention may further comprise molding at least one intermediate layer around the core or winding an elastic thread around the core to form a wound layer and molding a cover around the intermediate layer, or forming an inner core, and forming an outer core layer around the inner core from the core blend of the invention to form the golf ball core.

DETAILED DESCRIPTION OF THE INVENTION

A "cover" and/or a "core", as these terms are used herein, may be formed from a single layer or from two or more layers, and, thus, each may comprise one or a plurality of layers. As used herein, a core comprising a single layer refers to a unitary or one-piece core, and the layer includes the entire core from the center of the core to its outer periphery. A core, whether formed from a single layer or from two or more layers, may serve as a center for a wound ball. An intermediate layer may be incorporated, for example, with a single layer or multilayer cover, with a single layer or multilayer core, with both a single layer cover and core, or with both a multilayer cover and a multilayer core. Intermediate layers of the type described above are sometimes referred to in the art, and, thus, herein as well, as an inner cover layer, as an outer core layer, or as at least one mantle or intermediate layer.

As used herein, an "intermediate layer" is a layer interposed between a cover and a core of a golf ball. An intermediate layer may be distinguished from a cover and/or a core by some difference in the materials comprising the layers. An intermediate layer may, for example, have a distinct composition, a different proportion of components, a different molecular weight of a component, a different molecular weight distribution of a component, or a different degree of curing or cross-linking when compared to the corresponding attribute of the component comprising the cover or core layers.

As used herein, the term "polymer" means any type of polymer including random polymers, block polymers, etc.

As used herein, the terms "Low Modulus Ionomer" and "LMI" refer to terpolymers of an α-olefin, such as ethylene, a softening agent, such as methyl acrylate or iso-butyl-acrylate, and an α,β-unsaturated carboxylic acid, such as acrylic or methacrylic acid, where at least part of the acid groups are neutralized by metal atoms, such as, but not limited to, sodium, zinc, magnesium, or lithium. Low modulus ionomers are disclosed in U.S. Pat. No. 4,801,649 to Statz, the contents of which are incorporated herein in their entirety by reference.

As used herein, the terms "Low Modulus Ionomer acid terpolymer", "LMI acid terpolymer", and "acid terpolymer" of a Low Modulus Ionomer or LMI refer to terpolymers of an α-olefin, such as ethylene, a softening agent, such as methyl acrylate or iso-butyl-acrylate, and an α,β-unsaturated carboxylic acid, such as acrylic or methacrylic acid, where the acid groups have not been neutralized by metal atoms.

The present invention is directed to golf ball core compositions for forming golf balls comprising a cover and a core and, optionally, an intermediate layer situated between the cover and the core. Preferably, the core composition of the invention is used to form an outer layer of a golf ball core. The golf ball core compositions of the invention comprise at least one low modulus ionomer or acid terpolymer as an impact modifier to positively influence the properties of a finished golf ball. In particular, the addition of at least one low modulus ionomer or acid terpolymer to conventional core compositions is believed to significantly improve the impact durability of a golf ball due to an increase in the toughness and impact strength of the core of the finished golf ball without adversely affecting the initial velocity of the ball.

Low modulus ionomers and Low Modulus Ionomer acid terpolymers useful in the invention are typically terpolymers of the formula:

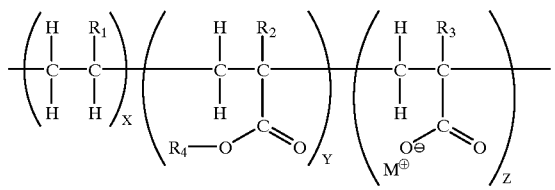

wherein $R_1$, $R_2$, and $R_3$ are hydrogen or $CH_3$;

$R_4$ is linear or branched alkyl of formula $C_nH_{2n+1}$, where n is an integer of from 1 to about 20, such as $CH_3$, $C_2H_5$, $C_3H_7$, $C_4H_9$, and $C_5H_{11}$;

$M^+$ is $H^+$, $Li^+$, $Zn^{30\ +}$, $Ca^{++}$, $W^{+++}$, or $Zr^{++}$; and x ranges from about 20 to about 85 weight per cent of the polymer, y ranges from about 1 to about 50 weight per cent of the polymer, and z ranges from about 1 to about 30 weight per cent of the polymer. As will be readily understood by one of ordinary skill in the art, when $M^+$ is $H^+$, a terpolymer of the formula above will be an LMI acid terpolymer, and when $M^+$ is other than $H^+$, the terpolymer will be an LMI. Preferably, the low modulus ionomer or acid terpolymer is a terpolymer comprising monomeric units of an α-olefin, a softening agent, such as an acrylate class ester, such as methyl acrylate, n-butyl-acrylate, or iso-butyl-acrylate, and an α,β-unsaturated carboxylic acid, where at least a portion of the acid groups are neutralized by at least one ion in the low modulus ionomer. Preferred low modulus ionomers and acid terpolymers include those having a flexural modulus of from about 500 to about 35,000 psi and a hardness of from about 40 Shore A to about 40 Shore D.

Low modulus ionomers are available commercially from Du Pont under the trade name SURLYN®, such as SURLYN® 9320, a copolymer of ethylene-n-butyl acrylate-methacrylic acid neutralized with zinc, and from Exxon under the trade name IOTEK®, typically, a copolymer of ethylene, acrylic acid, and methyl acrylate neutralized with a metal atom. Additionally, the low modulus ionomer compounds useful in the invention can be synthesized by a variety of synthetic routes known to the skilled organic chemist. Acid terpolymers are also available commercially, such as Nucrel RX9-1, a copolymer of ethylene-n-butyl acrylate-methacrylic acid, available from Du Pont. Low modulus ionomers may also be formed by the saponifying terpolymers comprising acrylate or methacryalte esters using methods known in the art, such as those disclosed in U.S. Pat. No. 5,869,578 to Rajagopalan, U.S. Pat. No. 5,218,057 to Kurkov et al., and U.S. Pat. No. 4,638,034 to McClain, the contents of which are incorporated herein by reference to the extent necessary to supplement this specification.

A representative base composition for forming at least a portion of a golf ball core prepared in accordance with the present invention comprises polybutadiene as the base rubber, and, in parts by weight based on 100 parts polybutadiene, about 20 to about 50 pph of a metal salt acrylate, such as diacrylate, dimethacrylate, or monomethacrylate, preferably zinc diacrylate. The polybutadiene preferably has a cis 1,4 content of above about 90 percent and more preferably above about 96 percent. However, high trans-polybutadiene may also be used with the present invention. Commercial sources of polybutadiene include Shell 1220, manufactured by Shell Chemical, Neocis BR40, manufactured by Enichem Elastomers, and Ubepol BR150, manufactured by Ube Industries, Ltd. If desired, the polybutadiene can also be mixed with other elastomers known in the art, such as natural or synthetic rubber, styrene butadiene rubber, and/or isoprene rubber in order to further modify the properties of the core. When a mixture of elastomers is used, the amounts of other constituents in the core composition are based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium or nickel. Zinc diacrylate is preferred, because it has been found to provide golf balls with a high initial velocity in the USGA test. The zinc diacrylate can be of various grades of purity. For the purposes of this invention, the lower the quantity of zinc stearate present in the zinc diacrylate, the higher the zinc diacrylate purity. Zinc diacrylate containing less than about 10 percent zinc stearate is preferable. More preferable is zinc diacrylate containing about 4 to about 8 percent zinc stearate. Suitable, commercially available zinc diacrylates include those from Sartomer. The preferred concentrations of zinc diacrylate that can be used are about 20 to about 50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1di(t-butylperoxy) 3,3,5-trimethyl cyclohexane, bis(t-butylperoxy) diisopropylbenzene, 2,5-dimethyl-2,5 di (t-butylperoxy) hexane, or di-t-butyl peroxide, and mixtures thereof. Other useful initiators would be readily apparent to one of ordinary skill in the art without any need for experimentation. The initiator(s) at 100 percent activity are preferably added in an amount ranging between about 0.05 and 2.5 pph based upon 100 parts of polybutadiene, or polybutadiene mixed with one or more other elastomers. More preferably, the amount of initiator added ranges between about 0.15 and 2 pph and most preferably between about 0.25 and 1.5 pph.

A typical golf ball core incorporates 5 to 50 pph of zinc oxide in a zinc diacrylate-peroxide cure system that cross-links polybutadiene during the core molding process.

In the present invention, at least one low modulus ionomer or acid terpolymer is added to a golf ball core composition in any amount that imparts the advantageous properties to the core and/or finished ball discussed herein. The low modulus ionomer or acid terpolymer may be present in an amount of about up to about 50 pph of elastomer. Preferably, the low modulus ionomer or acid terpolymer is present in an amount of about 5 to about 45 pph.

The cores and balls having cores produced from such an admixture typically exhibit enhanced performance properties, particularly when the admixture is used to form an outer layer of the core. In particular, the initial velocity of a golf ball is maintained at or near the maximum allowed by the USGA, while the toughness and impact strength of the golf ball core is improved significantly when the core is formed from an elastomer blend containing a low modulus ionomer or acid terpolymer.

It is believed that the durability of the core composition is improved, in part, as a result of the interaction of the free acid groups of the low modulus ionomer or acid terpolymer with the metal ion in the metal salt acrylate, which is believed to be similar to the interaction between the free acid groups and metal ions in ionomers. In addition, it is possible for the metal ions to migrate during the processing of the core compositions of the invention. In particular, the metal ions of the low modulus ionomer may exchange with the metal ions of the metal salt acrylate. This may be referred to as "ion-hopping". As a result, toughness and impact resistance of the cross-linked elastomer is improved, while maintaining a high initial velocity.

The compositions of the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, for example, zinc oxide, barium sulfate, tin oxide, metals, such as titanium, tungsten, and platinum, hollow glass or ceramic spheres, and regrind (which is recycled core molding matrix ground to 30 mesh particle size). The amount and type of filler utilized is governed by the amount and weight of other ingredients in the composition, since a maximum golf ball weight of 1.620 ounces (45.92 g) has been established by the USGA. Appropriate fillers generally used range in specific gravity from about 2.0 to 15.

Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants.

Other ingredients such as accelerators, peptizers, processing aids, processing oils, plasticizers, foaming agents, dyes and pigments, as well as other additives well known to the skilled artisan may also be used in the present invention in amounts sufficient to achieve the purpose for which they are typically used.

The core compositions of the invention may be produced by forming a mixture comprising at least polybutadiene, zinc diacrylate, and at least one low modulus ionomer or acid terpolymer. In preparing the core blends, when a set of predetermined conditions is met, i.e., time and temperature of mixing, the free radical initiator is added in an amount dependent upon the amounts and relative ratios of the starting components, all of which would be well understood by one of ordinary skill in the art. In particular, as the components are mixed, the resultant shear causes the temperature of the mixture to rise. At least one peroxide free radical initiator is also blended into the mixture to cross-link the core composition during the molding process.

After completion of the mixing, the golf ball core composition is milled and hand prepped or extruded into pieces ("preps") suitable for molding. The milled preps are then compression molded into cores at an elevated temperature. Typically, 160° C. (320° F.) for 15 minutes is suitable for this purpose. These cores can then be used to make finished golf balls by surrounding the cores with mantle and/or cover materials.

The present invention is directed towards not only cores for use in conventional two-piece and wound golf balls, but also to cores for multilayer golf balls as well. In fact, the present invention contemplates that the presently claimed cores can be employed in golf balls of any construction, wherein the construction includes a solid or foamed core, as well as hollow, liquid or gas filled cores.

EXAMPLES

The following non-limiting examples are merely illustrative of the preferred embodiments of the present invention, and are not to be construed as limiting the invention, the scope of which is defined by the appended claims.

Golf ball cores were formed using the golf ball inner core and outer core compositions provided in Table 1. Half shells from the outer core compositions of the control and of the invention were formed, and compression molded around solid, 1 inch diameter inner cores formed from the inner core compositions to form 1.58 inch diameter cores. The cores were then covered with an ionomer cover composition having a flexural modulus of about 35,000 to 45,000 psi and a hardness of Shore D 63. The resulting golf balls were tested for COR, initial velocity, and durability.

Although both cores and covered balls in accordance with the invention have a compression that is about 10 points lower than cores and balls that do not incorporate an LMI as an impact modifier in the core, the COR of the cores and the velocity of the balls that incorporate an LMI as an impact modifier are substantially the same as that of the harder cores and balls, which do not incorporate an LMI as an impact modifier. Moreover, the golf balls of the invention are clearly more durable than balls having cores that do not incorporate an LMI as an impact modifier.

TABLE I

| Ingredients | Inner Core Center wt % | Outer Core Control wt % | Outer Core Invention wt % |
| --- | --- | --- | --- |
| Polybutadiene[1] | 71.54 | 51.88 | 52.55 |
| Zinc Diacrylate | 8.58 | 24.65 | 24.96 |
| Peroxide Initator[2] | 0.58 | — | — |
| Peroxide Initator[3] | — | 0.27 | 0.28 |
| Peroxide Initator[4] | — | 0.1 | 0.1 |
| Trans-poly isoprene[5] | — | 12.97 | 9.85 |
| Surlyn 9320[6] | — | — | 3.28 |
| Zinc Oxide | 19.3 | 10.13 | 8.98 |
| Core Properties | | | |
| Compression | | 50 | 40 |
| COR[7] | | 0.769 | 0.757 |
| Ball Properties | | | |
| Compression | | 73 | 63 |
| Ball Velocity ft/sec | | 251.9 | 251.8 |
| Durability Test[8] No. Hits per Ball before 1st Ball Failure in 12 Ball Group | | 50 | 100 |
| Durability Test[8] No. Hits per Ball before 50% Ball Failure in 12 Ball Group | | 100 | 150 |

[1]Shell Cariflex BR-1220
[2]Varox 802-40KE-HP
[3]Varox 231-XL
[4]DBDB-60
[5]TP251
[6]Du Pont ionomer; a copolymer of ethylene-n-butyl acrylate-methacrylic acid neutralized with zinc.
[7]COR at 125 ft/sec incoming velocity.
[8]Test conducted on finished golf balls.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

What is claimed is:

1. A method for making a golf ball core comprising:
   (a) selecting a low modulus ionomer terpolymer or acid terpolymer of formula:

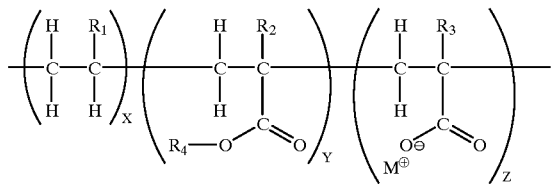

wherein
   $R_1$, $R_2$, and $R_3$ are hydrogen or $CH_3$;
   $R_4$ is linear or branched alkyl of formula $C_nH_{2n+1}$, where n is an integer, such as $CH_3$, $C_2H_5$, $C_3H_7$, $C_4H_9$, and $C_5H_{11}$;
   $m^+$ is $H^+$, $Li^+$, $Zn^{++}$, $Ca^{++}$, $Ti^{++}$, $Mg^{++}$, $Na^+$, $W^{+++}$, or $Zr^{++}$; and
   x ranges from about 20 to about 85 weight per cent of the polymer, y ranges from about 1 to about 50 weight per cent of the polymer, and z ranges from about 1 to about 30 weight per cent of the polymer;
   (b) forming a rubber or elastomer blend comprising the low modulus ionomer or acid terpolymer, a base rubber, a metal salt acrylate or diacrylate, and an initiator;
   (c) molding the blend for a time and at a temperature sufficient to cross link the blend to form a golf ball core; and
   (d) molding a cover around the golf ball core to form a golf ball.

2. The method of claim 1, further comprising selecting a base rubber free of cross linking for the blend.

3. The method of claim 1, further comprising selecting a low modulus ionomer or acid terpolymer comprising monomeric units of an α-olefin, a softening agent, and an α,β-unsaturated carboxylic acid at least partially neutralized by at least one ion.

4. The method of claim 3, further comprising selecting an acrylate class ester as the softening agent.

5. The method of claim 1, further comprising selecting polybutadiene as the elastomer.

6. The method of claim 1, further comprising: molding at least one intermediate layer around the core; and molding a cover around the intermediate layer.

7. The method of claim 1, further comprising: winding an elastic thread around the core to form a wound layer; and molding a cover around the wound layer.

8. The method of claim 1, further comprising forming an inner core, and forming an outer core layer around the inner core from the core blend to form the golf ball core.

* * * * *